(12) United States Patent
Nayak

(10) Patent No.: US 12,015,651 B2
(45) Date of Patent: Jun. 18, 2024

(54) APPARATUS, METHOD AND COMPUTER PROGRAM FOR SUPPORTING FIXED-LINE USER EQUIPMENT

(71) Applicant: NOKIA TECHNOLOGIES OY, Espoo (FI)

(72) Inventor: Ashok Kumar Nayak, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 492 days.

(21) Appl. No.: 17/425,199

(22) PCT Filed: Jan. 31, 2019

(86) PCT No.: PCT/EP2019/052405
§ 371 (c)(1),
(2) Date: Jul. 22, 2021

(87) PCT Pub. No.: WO2020/156675
PCT Pub. Date: Aug. 6, 2020

(65) Prior Publication Data
US 2022/0094721 A1     Mar. 24, 2022

(51) Int. Cl.
*H04L 65/1016* (2022.01)
*H04L 65/1073* (2022.01)
*H04L 67/52* (2022.01)

(52) U.S. Cl.
CPC ...... *H04L 65/1016* (2013.01); *H04L 65/1073* (2013.01); *H04L 67/52* (2022.05)

(58) Field of Classification Search
CPC .. H04L 65/1016; H04L 65/1073; H04L 67/52
See application file for complete search history.

(56) References Cited

U.S. PATENT DOCUMENTS 10,694,367 B1 * 6/2020 Sharma ............... H04L 67/535
2007/0117562 A1   5/2007 Shim et al.
(Continued)

FOREIGN PATENT DOCUMENTS

AU   2005270966 A1 *  3/2007  ............ H04L 63/08
CN      1452382 A     10/2003
CN      1878357 A     12/2006
(Continued)

OTHER PUBLICATIONS

Communication under Rule 71(3) EPC dated Oct. 27, 2023, corresponding to European Patent Application No. 19702885.5.
(Continued)

*Primary Examiner* — Asghar H Bilgrami
(74) *Attorney, Agent, or Firm* — SQUIRE PATTON BOGGS (US) LLP

(57) ABSTRACT

The disclosed apparatus comprises means for performing storing location information of one or more fixed-line user equipment operating in an internet protocol multimedia subsystem. In response to an update of location information at the apparatus for one or more of the fixed-line user equipment, the apparatus comprises means for sending a message to a serving call state control function serving the one or more fixed-line user equipment. The message indicates a location update of the one or more fixed-line user equipment whose location information has been updated at the apparatus.

15 Claims, 6 Drawing Sheets

(56) References Cited

U.S. PATENT DOCUMENTS

| | | | | |
|---|---|---|---|---|
| 2013/0086653 A1* | 4/2013 | Gupta | ............... | H04W 28/0247 |
| | | | | 726/5 |
| 2016/0150497 A1* | 5/2016 | Janosi | ................... | H04W 60/06 |
| | | | | 455/435.1 |

FOREIGN PATENT DOCUMENTS

| | | | | |
|---|---|---|---|---|
| CN | 102474523 A | 5/2012 | | |
| EP | 1 849 280 A1 | 10/2007 | | |
| JP | 2016072988 A | 5/2016 | | |
| WO | WO-2004099919 A2 * | 11/2004 | ........... | H04L 51/066 |
| WO | WO 2006/072817 A1 | 7/2006 | | |
| WO | WO-2009068429 A1 * | 6/2009 | ......... | H04L 67/1002 |

OTHER PUBLICATIONS

International Search Report and Written Opinion dated Sep. 26, 2019 corresponding to International Patent Application No. PCT/EP2019/052405.

3GPP TS 23.167 V15.4.0 (Dec. 2018), Technical Specification, 3rd Generation Partnership Project; Technical Specification Group Services and System Aspects; IP Multimedia Subsystem (IMS) emergency sessions (Release 15), Dec. 2018.

3GPP TS 29.228 V14.5.0 (Dec. 2017), Technical Specification, 3rd Generation Partnership Project; Technical Specification Group Core Network and Terminals; IP Multimedia (IM) Subsystem Cx and Dx interfaces; Signalling flows and message contents (Release 14), Dec. 21, 2017, pp. 1-82, XP051392048.

3GPP TS 29.229 V15.0.0 (Jun. 2018), Technical Specification, 3rd Generation Partnership Project; Technical Specification Group Core Network and Terminals; Cx and Dx interfaces based on the Diameter protocol; Protocol details (Release 15), Jun. 23, 2018, pp. 1-41, XP051474087.

3GPP TS 24.229 V16.0.0 (Dec. 2018), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 16), Dec. 14, 2018, XP051573070.

Rejection Decision from the China National Intellectual Property Administration dated Apr. 26, 2023, corresponding to Chinese Patent Application No. 201980090960.2.

Office Action dated Oct. 10, 2022, corresponding to Chinese Patent Application No. 2019800909602.

Search Report dated Sep. 29, 2022, corresponding to Chinese Patent Application No. 2019800909602.

IP Multimedia (IM) Subsystem Cx and Dx interfaces; Signalling flows and message contents (Release 14), Technical Specification Group Core Network and Terminals.

Cx and Dx interfaces based on the Diameter protocol; Protocol details (Release 15), Technical Specification Group Core Network and Terminals.

IP multimedia multimedia call control protocol based on Session Initiation Protocol (SIP) and Session Description Protocol (SDP); Stage 3 (Release 16), Technical Specification Group Core Network and Terminals.

European Notice of Allowance issued in corresponding European Patent Application No. 19 702 885.5-1213 on Feb. 15, 2024.

* cited by examiner

APPARATUS, METHOD AND COMPUTER PROGRAM FOR SUPPORTING FIXED-LINE USER EQUIPMENT

FIELD

This disclosure relates to communications. More particularly the present invention relates to the serving or supporting of fixed-line user equipment in an Internet Protocol Multimedia Subsystem (IMS)

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

A user can access a communication system by means of an appropriate communication device or terminal capable of communicating with a base station.

Hence nodes like base stations are often referred to as access points. A communication device of a user is often referred to as user equipment (UE).

A communication system and associated devices typically operate in accordance with a given standard or specification which sets out what the various entities associated with the system are permitted to do and how that should be achieved.

The Internet Protocol Multimedia Subsystem (IMS) is an architectural framework for delivering IP multimedia services.

STATEMENT OF INVENTION

According to a first aspect there is provided an apparatus comprising means for performing: storing location information of one or more fixed-line user equipment operating in an internet protocol multimedia subsystem; and in response to an update of location information at the apparatus for one or more of the fixed-line user equipment, sending a message to a serving call state control function serving the one or more fixed-line user equipment, the message indicating a location update of the one or more fixed-line user equipment whose location information has been updated at the apparatus.

According to an example, the means are further configured to perform the update of location information of the one or more fixed-line user equipment at the apparatus in response to receiving a location update request at the apparatus.

According to an example the location information comprises a PIN or area code of the one or more fixed-line user equipment.

According to an example the sending a message to the serving call state control function comprises sending a registration termination request to the serving call state control function.

According to an example the registration termination request comprises an attribute value pair indicating the location update.

According to an example a value of the attribute value pair being REFLOC_CHANGE.

According to an example the means are further configured to perform receiving a registration termination response from the serving call state control function in response to the indicating a location update of the one or more fixed-line user equipment to the serving call state control function.

According to an example the means comprises at least one processor; and at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: storing location information of one or more fixed-line user equipment operating in an internet protocol multimedia subsystem; and in response to an update of location information at the apparatus for one or more of the fixed-line user equipment, sending a message to a serving call state control function serving the one or more fixed-line user equipment, the message indicating a location update of the one or more fixed-line user equipment whose location information has been updated at the apparatus.

According to an example, the at least one memory and the computer program code are further configured to, with the at least one processor, cause the apparatus at least to perform an update of location information of the one or more fixed-line user equipment at the apparatus in response to receiving a location update request at the apparatus.

According to an example the location information comprises a PIN or area code of the one or more fixed-line user equipment.

According to an example the sending a message to the serving call state control function comprises sending a registration termination request to the serving call state control function.

According to an example the registration termination request comprises an attribute value pair indicating the location update.

According to an example a value of the attribute value pair being REFLOC_CHANGE.

According to an example the at least one memory and the computer program code are further configured to, with the at least one processor, cause the apparatus to perform receiving a registration termination response from the serving call state control function in response to the indicating a location update of the one or more fixed-line user equipment to the serving call state control function.

According to a third aspect there is provided an apparatus comprising: storing circuitry for storing location information of one or more fixed-line user equipment operating in an internet protocol multimedia subsystem; and sending circuitry for, in response to an update of location information at the apparatus for one or more of the fixed-line user equipment, sending a message to a serving call state control function serving the one or more fixed-line user equipment, the message indicating a location update of the one or more fixed-line user equipment whose location information has been updated at the apparatus.

According to a fourth aspect there is provided a method comprising: storing at an apparatus location information of one or more fixed-line user equipment operating in an internet protocol multimedia subsystem; and in response to an update of location information for one or more of the fixed-line user equipment, sending a message to a serving call state control function serving the one or more fixed-line user equipment, the message indicating a location update of the one or more fixed-line user equipment whose location information has been updated at the apparatus.

According to an example the method comprises performing the update of location information of the one or more fixed-line user equipment in response to receiving a location update request at the apparatus.

According to an example the location information comprises a PIN or area code of the one or more fixed-line user equipment.

According to an example the sending a message to the serving call state control function comprises sending a registration termination request to the serving call state control function.

According to an example the registration termination request comprises an attribute value pair indicating the location update.

According to an example a value of the attribute value pair being REFLOC_CHANGE.

According to an example, the method comprises receiving a registration termination response from the serving call state control function in response to the indicating a location update of the one or more fixed-line user equipment to the serving call state control function.

According to a fifth aspect there is provided a computer program comprising instructions for causing an apparatus to perform at least the following: storing at the apparatus location information of one or more fixed-line user equipment operating in an internet protocol multimedia subsystem; and in response to an update of location information for one or more of the fixed-line user equipment, sending a message to a serving call state control function serving the one or more fixed-line user equipment, the message indicating a location update of the one or more fixed-line user equipment whose location information has been updated at the apparatus.

According to a sixth aspect there is provided a computer program comprising instructions stored thereon for performing at least the following: storing at an apparatus location information of one or more fixed-line user equipment operating in an internet protocol multimedia subsystem; and in response to an update of location information for one or more of the fixed-line user equipment, sending a message to a serving call state control function serving the one or more fixed-line user equipment, the message indicating a location update of the one or more fixed-line user equipment whose location information has been updated at the apparatus.

According to a seventh aspect there is provided a non-transitory computer readable medium comprising program instructions for causing an apparatus to perform at least the following: storing at the apparatus location information of one or more fixed-line user equipment operating in an internet protocol multimedia subsystem; and in response to an update of location information for one or more of the fixed-line user equipment, sending a message to a serving call state control function serving the one or more fixed-line user equipment, the message indicating a location update of the one or more fixed-line user equipment whose location information has been updated at the apparatus.

According to an eighth aspect there is provided a non-transitory computer readable medium comprising program instructions stored thereon for performing at least the following: storing at the apparatus location information of one or more fixed-line user equipment operating in an internet protocol multimedia subsystem; and in response to an update of location information for one or more of the fixed-line user equipment, sending a message to a serving call state control function serving the one or more fixed-line user equipment, the message indicating a location update of the one or more fixed-line user equipment whose location information has been updated at the apparatus.

According to a ninth aspect there is provided an apparatus comprising means for performing: receiving, from a home subscriber server, an indication of a location update of one or more fixed-line user equipment being served by the apparatus.

According to an example the means are further configured to perform, in response to the receiving an indication, sending a notification to the one or more fixed-line user equipment, the notification configured to cause the one or more fixed-line user equipment to re-register in the network.

According to an example the notification comprises a NOTIFY message comprising a deactivation event field.

According to an example the means are further configured to perform receiving a registration request from the one or more fixed-line user equipment in response to the sending a notification to the one or more fixed-line user equipment.

According to an example the receiving an indication from the home subscriber server comprises receiving a registration termination request.

According to an example the registration termination request comprises an attribute value pair indicating the location update, a value of the attribute value pair being REFLOC_CHANGE.

According to an example the means are further configured to perform updating location information of the one or more fixed-line user equipment at the apparatus, in response to the receiving an indication from the home subscriber server.

According to an example the means are further configured to perform updating emergency call information for the one or more fixed-line user equipment, in response to the receiving a response from the home subscriber server.

According to an example the emergency call information comprises public safety answering point information.

According to an example the means comprises at least one processor; and at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: receiving, from a home subscriber server, an indication of a location update of one or more fixed-line user equipment being served by the apparatus.

According to an example, the at least one memory and the computer program code further configured to, with the at least one processor, cause the apparatus at least to perform, in response to the receiving an indication, sending a notification to the one or more fixed-line user equipment, the notification configured to cause the one or more fixed-line user equipment to re-register in the network.

According to an example, the notification comprising a NOTIFY message comprising a deactivation event field.

According to an example, the at least one memory and the computer program code configured to, with the at least one processor, cause the apparatus at least to perform receiving a registration request from the one or more fixed-line user equipment in response to the sending a notification to the one or more fixed-line user equipment.

According to an example the receiving an indication from the home subscriber server comprises receiving a registration termination request.

According to an example the registration termination request comprises an attribute value pair indicating the location update, a value of the attribute value pair being REFLOC_CHANGE.

According to an example the at least one memory and the computer program code configured to, with the at least one processor, cause the apparatus at least to perform updating location information of the one or more fixed-line user equipment at the apparatus, in response to the receiving an indication from the home subscriber server.

According to an example the at least one memory and the computer program code configured to, with the at least one processor, cause the apparatus at least to perform updating emergency call information for the one or more fixed-line user equipment, in response to the receiving a response from the home subscriber server.

According to an example, the emergency call information comprises public safety answering point information.

According to an eleventh aspect there is provided an apparatus comprising receiving circuitry for receiving, from a home subscriber server, an indication of a location update of one or more fixed-line user equipment being served by the apparatus.

According to a twelfth aspect there is provided a method comprising: receiving at an apparatus from a home subscriber server, an indication of a location update of one or more fixed-line user equipment being served by the apparatus.

According to an example the method comprises, in response to the receiving an indication, sending a notification to the one or more fixed-line user equipment, the notification configured to cause the one or more fixed-line user equipment to re-register in the network.

According to an example, the notification comprises a NOTIFY message comprising a deactivation event field.

According to an example the method comprises receiving a registration request from the one or more fixed-line user equipment in response to the sending a notification to the one or more fixed-line user equipment.

According to an example the receiving an indication from the home subscriber server comprises receiving a registration termination request.

According to an example the registration termination request comprises an attribute value pair indicating the location update.

According to an example a value of the attribute value pair being REFLOC_CHANGE.

According to an example the method comprises updating location information of the one or more fixed-line user equipment at the apparatus, in response to the receiving an indication from the home subscriber server.

According to an example the method comprises updating emergency call information for the one or more fixed-line user equipment, in response to the receiving a response from the home subscriber server.

According to an example the emergency call information comprises public safety answering point information.

According to a thirteenth aspect there is provided a computer program comprising instructions for causing an apparatus to perform at least the following: receiving at the apparatus from a home subscriber server, an indication of a location update of one or more fixed-line user equipment being served by the apparatus.

According to a fourteenth aspect there is provided a computer program comprising instructions stored thereon for performing at least the following: receiving at an apparatus from a home subscriber server, an indication of a location update of one or more fixed-line user equipment being served by the apparatus.

According to a fifteenth aspect there is provided a non-transitory computer readable medium comprising program instructions for causing an apparatus to perform at least the following: receiving at the apparatus from a home subscriber server, an indication of a location update of one or more fixed-line user equipment being served by the apparatus.

According to a sixteenth aspect there is provided a non-transitory computer readable medium comprising program instructions stored thereon for performing at least the following: receiving at an apparatus from a home subscriber server, an indication of a location update of one or more fixed-line user equipment being served by the apparatus.

BRIEF DESCRIPTION OF FIGURES

The invention will now be described in further detail, by way of example only, with reference to the following examples and accompanying drawings, in which.

DETAILED DESCRIPTION

Figure 1:
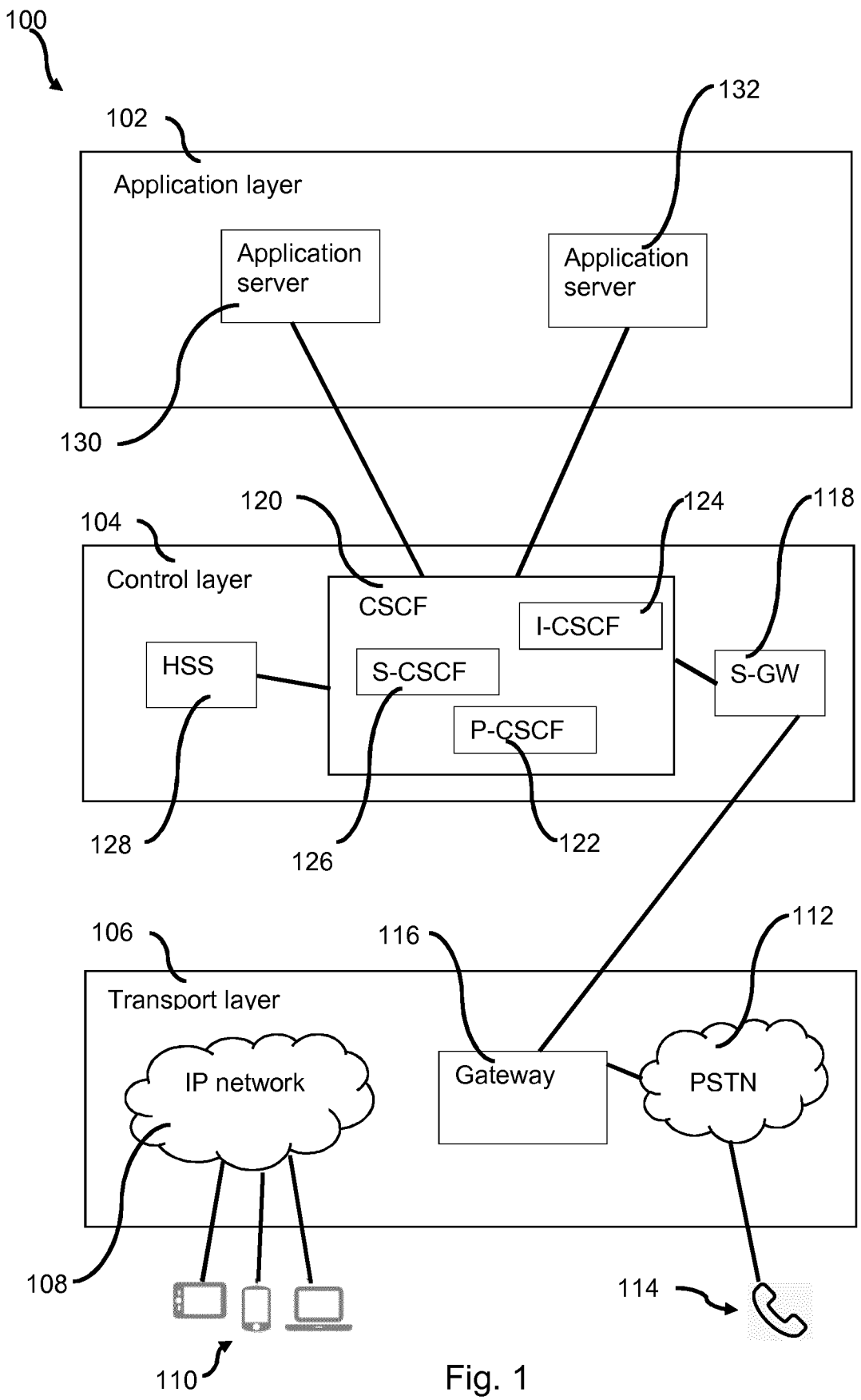
FIG. 1 shows a schematic example of an IMS where the invention may be implemented.

FIG. 1 schematically shows some aspects of an IMS 100. The IMS 100 comprises an application layer 102, a control layer 104, and a transport layer 106.

The transport layer 106 is schematically shown as comprising an IP network 108, to which one or more UEs 110 are connected. The transport layer 106 also comprises public-switched telephone network PSTN 112, to which one or more UEs 114 is connected. According to some examples there may also be an IP private branch exchange (IP-PBX) between the UE 114 and the PSTN 112. For example an IP-PBX may be located at an enterprise or business premises hosting UE 114. The one or more UEs 110 and 114 may comprise any one or more of: a phone; a tablet; a PC etc. One or more of the one or more UEs 110 and 114 may be mobile or fixed-line.

A fixed-line UE is a static device. For example a fixed line UE may connect to the transport layer 106 via a cable or wire at the location of the fixed-line device. A fixed-line UE is not expected to move location once it has been registered at a location, which contrasts with a UE such as a mobile UE which is of course expected to move and provide location updates after initial registration and during use. For example a landline phone is an example of a fixed-line UE.

Gateway 116 of transport layer 106 connects to serving gateway (S-GW) 118 of control layer 104. The control layer 104 comprises a call session control function (CSCF) 120. The CSCF 120 comprises a proxy call session control function (P-CSCF) 122, an interrogating call session control function (I-CSCF) 124, and a serving call session control function (S-CSCF) 126. The S-CSCF 126 is configured to communicate with home subscriber server (HSS) 128.

In the example of FIG. 1 the application layer 102 is schematically shown as comprising application servers 130 and 132. The application servers 130 and 132 are in communication with CSCF 120 of control layer 104. The application servers may be configured for providing services to end users.

Location information of a UE plays a role in operating a telecommunication network. For example, using location information of a UE an operator may provide multiple services such as identifying a correct PSAP (Public Safety Access Point) in case of emergency calls, for performing optimal routing in the network etc. Existing standard 3GPP TS 23.167 mentions how locations of UEs are identified by the network, including a reference location mechanism for fixed-line UEs.

The present inventor has identified that there may be problems faced by fixed line UEs when an update occurs at a location of a fixed-line UE, for example a location update. This is explained in more detail below.

Currently, 3GPP TS 29.228 describes a reference location configuration at HSS, and a procedure for updating a reference location configuration to S-CSCF. Similarly, 3GPP TS 23.167 describes handling of this reference location information by S-CSCF, and providing location information of fixed line UEs to other network elements. However, when a location update occurs and is provisioned at HSS, 3GPP TS 29.228 recommends that the HSS sends a registration termination request (RTR) to S-CSCF. The location update may occur, for example, because an area address, such as a PIN (Postal Index Number), is changed or updated by an authority such as a government, rather than movement of the fixed-line UE. In such a case modification is required at HSS. This RTR has a "Deregistration-reason" attribute value pair (AVP) with a Reason-Code of "PERMANENT_TERMINATION". After receiving the RTR with the above reason, S-CSCF proceeds to initiate network deregistration procedure by sending a NOTIFY message in xml with "state=terminated" and "event=rejected" to fixed line UEs. Upon receipt of the NOTIFY message with event=rejected, it is expected that no further registration should be sent to the network by a fixed line UE associated with the RTR. In light of this deregistration there will be no service which can be provided by the network to such deregistered fixed-line UEs, such as IP-PBX in an enterprise scenario. The enterprise scenario may for example be an IP-PBX located at business premises.

Figure 2:
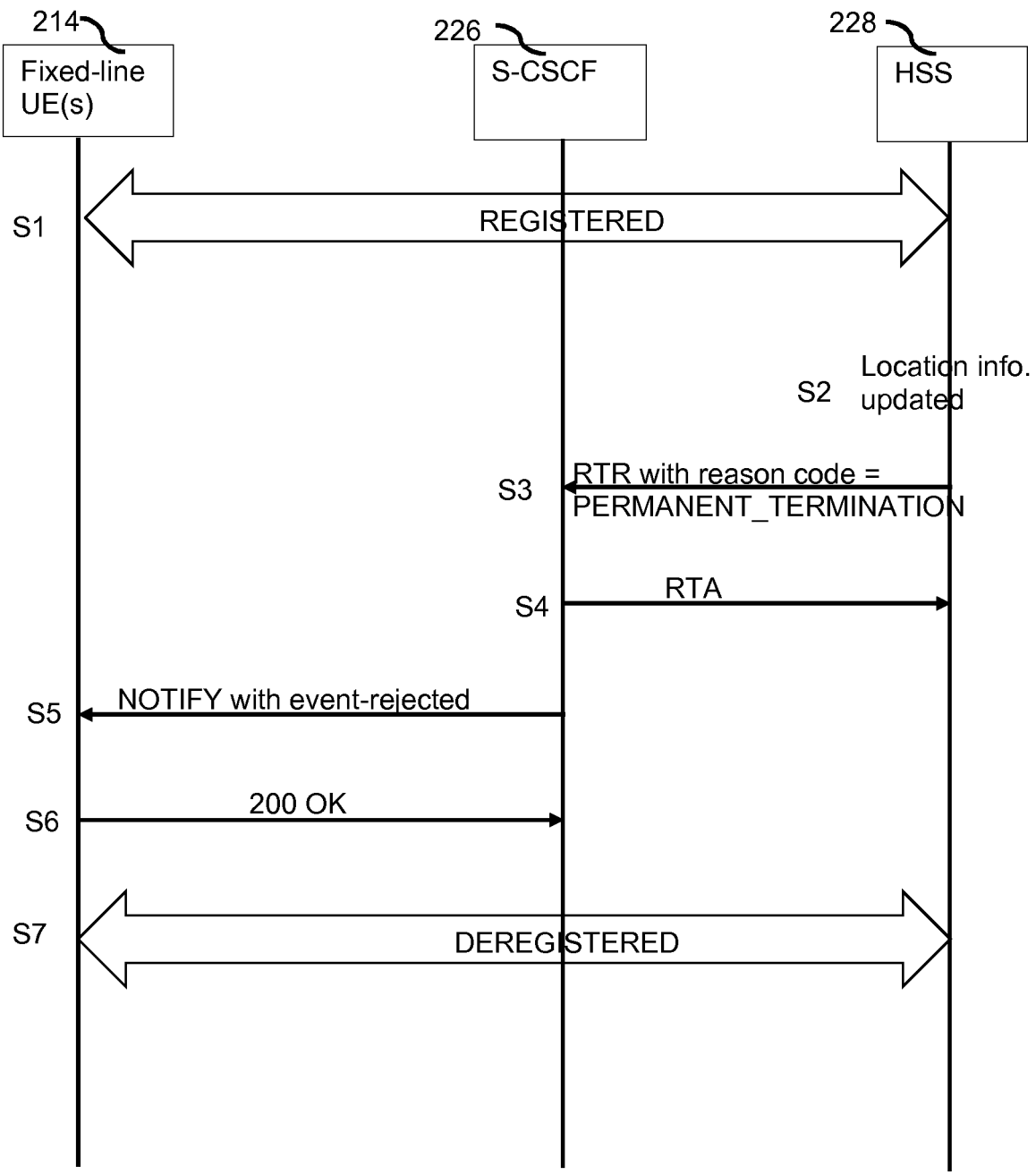
FIG. 2 shows a signalling diagram according to an example.

This situation is described in more detail with respect to the signalling diagram of FIG. 2, which describes signalling between one or more fixed-line UEs 214 (or an entity controlling one or more fixed-line UEs, such as an IP-PBX), an S-CSCF 226 and an HSS 228.

S1 shows an initial registration procedure, where fixed-line UE 214 is registered with HSS 228. Such registration may occur for example during installation or set-up of fixed-line UE 214.

At S2, location information is updated at HSS 228. For example, at S2 location information of fixed-line UE 214 is stored at HSS 228. For example location information such as a PIN or area code of fixed-line may be updated at HSS 228.

In response to this update at HSS 228, and in accordance with 3GPP TS 29.228, HSS 228 sends an RTR (registration termination request) with reason code=PERMANENT TERMINATION to S-CSCF 226, as shown at S3.

In response, at S4 S-CSCF 226 sends an RTA (registration termination response) to HSS 228.

Furthermore, at S5 the S-CSCF 226 sends a NOTIFY message to fixed-line UE 214. In some examples the NOTIFY message comprises an xml message, with "state=terminated" and "event=rejected".

The fixed-line UE 214 confirms receipt of the NOTIFY message by sending a 2000K message back to the S-CSCF 226, as shown at S6.

Effectively the fixed-line UE 214 is now deregistered, as shown at S7.

Furthermore, as there is no expectation from the network that the client (fixed-line UE) will register again, then no further service is provided from the network.

In order to overcome this problem it is proposed that, in response to a location change request, the HSS indicates an accurate or correct deregistration reason to S-CSCF. Then, after receiving the correct deregistration reason the SCSF will use "event=deactivated" as per 3GPP TS 24.229, instead of "event=rejected". This causes the fixed-line UE to register again with the network. Accordingly the S-CSCF will obtain updated reference location information from the HSS, rather than remaining in a deregistered state.

Figure 3:
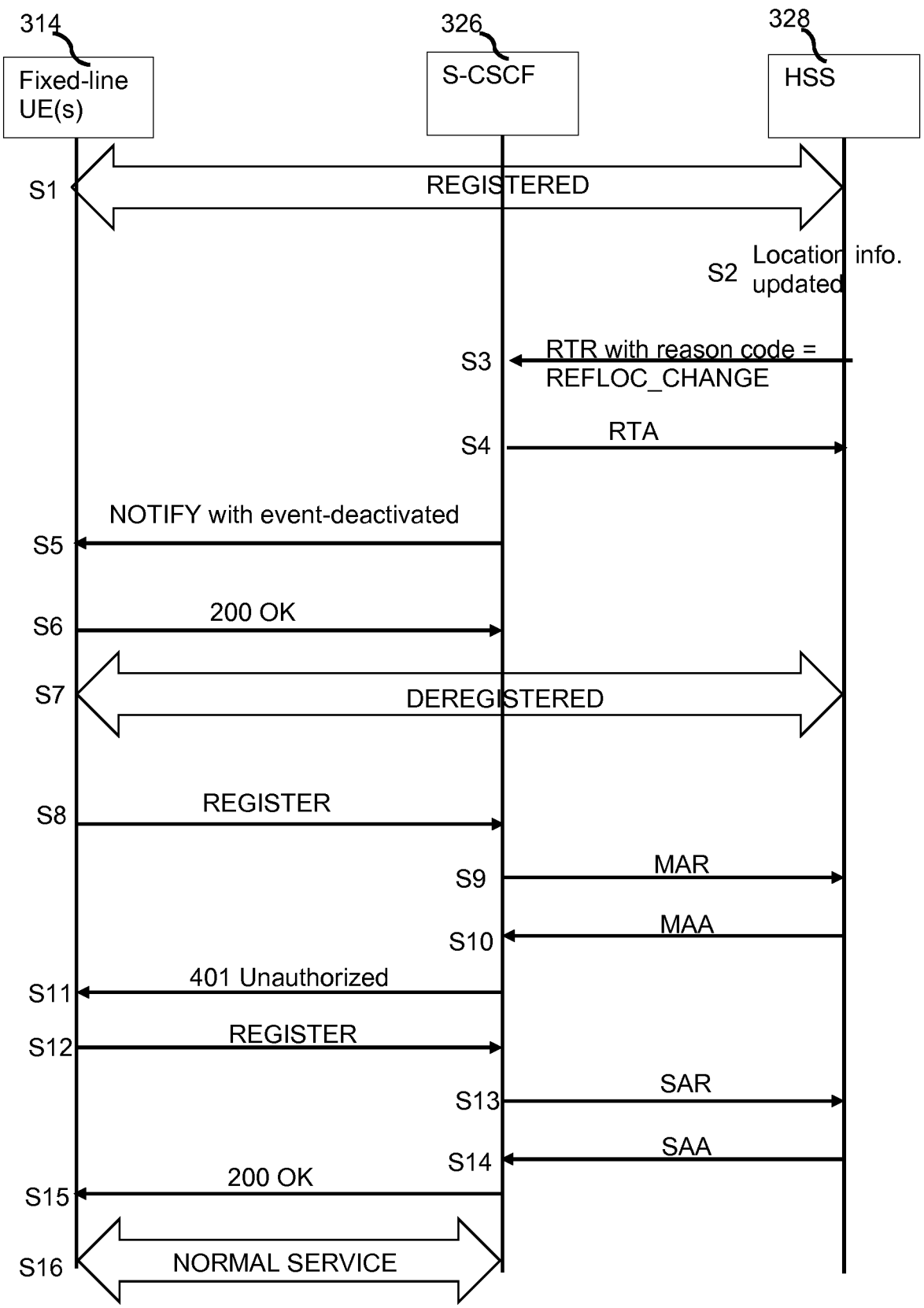
FIG. 3 shows a signalling diagram according to an example.

This is explained in more detail with respect to the signalling diagram of FIG. 3.

S1 shows an initial registration procedure, where fixed-line UE 314 registers with HSS 328. Such registration may occur for example during installation or set-up of fixed-line UE 314. At S1 HSS stores location information of fixed-line UE 314, for example a PIN or area code.

At S2, location information of fixed-line UE 314 is updated at HSS 328. For example location information such as a PIN code may be updated at HSS 328.

In response to this update at HSS 328, HSS 328 sends an RTR (registration termination request) with reason code=REFLOC_CHANGE to S-CSCF 326, as shown at S3. This contrasts with the reason code=PERMANENT_TERMINATION as per S3 of FIG. 2. In other words, in response to a location information change of UE 314, the HSS responds with a termination request that properly or accurately explains the reason for the termination request.

In response, at S4 S-CSCF 326 sends an RTA (registration termination response) to HSS 328.

Furthermore, at S5 the S-CSCF 326 sends a NOTIFY message to fixed-line UE 314. As shown in this example the NOTIFY message sent at S5 comprises an "event=deactivated" field. This contrasts with the NOTIFY message sent at S5 of FIG. 3, in which the NOTIFY message comprises an "event=rejected" field. In some examples the NOTIFY message at S5 of FIG. 3 comprises an xml message.

The fixed-line UE 314 confirms receipt of the NOTIFY message by sending a 2000K message back to the S-CSCF 326, as shown at S6.

Effectively the fixed-line UE 314 is now deregistered, as shown at S7.

However, differing with the example of FIG. 2, it is not assumed by the network that the fixed-line UE 314 will not re-register with the network, because fixed line UE 314 is, effectively, considered by the network as temporarily deactivated rather than irretrievably rejected.

As shown at S8, fixed-line UE 314 attempts to re-register with S-CSCF 326 by sending a REGISTER message from fixed-line UE 314 to S-CSCF 326.

At S9, the S-CSCF 326 sends a MAR (Multimedia Authentication Request) message to HSS 328.

As shown at S10, HSS 328 responds to S-CSCF 326 with a MAA (Multimedia Authentication Answer).

In response, at S11 the S-CSCF 326 sends a 401 Unauthorized message to fixed-line UE 314.

The 401 Unauthorized message causes the fixed-line UE 314 to attempt to register, which is shown at S12.

Then, at S13 the S-CSCF 326 sends a SAR (Server Assignment Request) message to HSS 328.

At S14 the HSS 328 responds to the S-CSCF 326 with a SAA (Server Assignment Answer) message.

The S-CSCF then sends a 200 OK message to fixed-line UE 314 confirming receipt of the REGISTER message, as shown at S15.

Normal service can then be resumed with fixed-line UE connected to the network, as shown at S16.

It will therefore be understood that after an update for a fixed-line UE, the fixed-line UE can still register normally with the network and experience a normal service. Furthermore, the S-CSCF will be updated with the correct updated reference location. The S-CSCF can then, for example, use the updated reference location information to obtain information of a correct public safety answering point information (PSAP) for emergency calls from the fixed-line user equipment.

Figure 4:
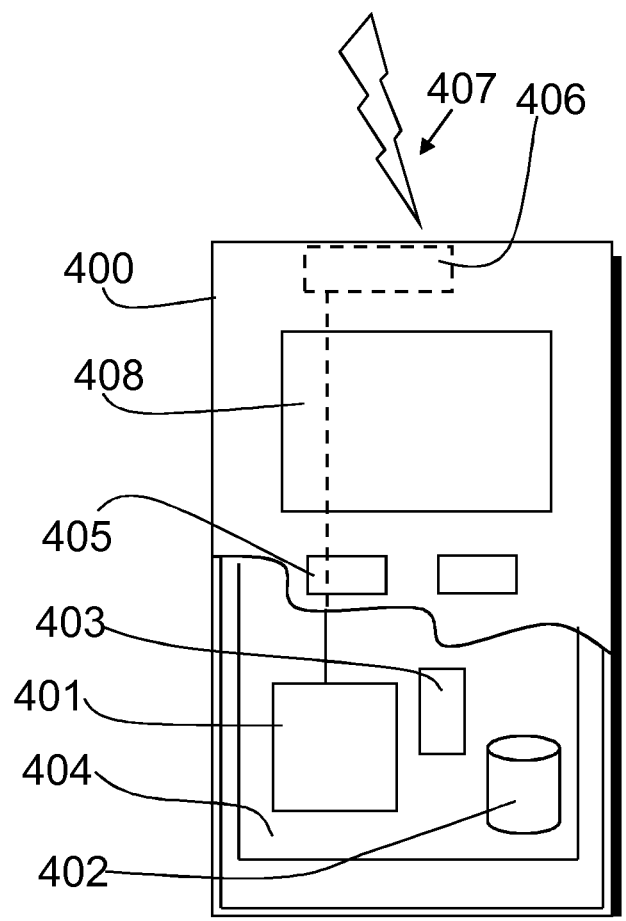
FIG. 4 schematically shows parts of a user equipment according to an example.

A possible communication device (e.g. fixed-line UE 314) will now be described in more detail with reference to FIG. 4 showing a schematic, partially sectioned view of a communication device 400.

The device 400 may receive signals over an air, radio, or wired interface 407 via appropriate apparatus for receiving, and may transmit signals via appropriate apparatus for transmitting signals. In FIG. 4 transceiver apparatus is designated schematically by block 406. The transceiver apparatus 406 may be provided for example by means of a radio part and associated antenna arrangement, and/or appropriate wiring. The antenna arrangement may be arranged internally or externally to the wireless device.

A UE is typically provided with at least one data processing entity 401, at least one memory 402 and other possible components 403 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 404. The user may control the operation of the wireless device by means of a suitable user interface such as key pad 405, voice commands, touch sensitive screen or pad, combinations thereof or the like. A display 408, a speaker and a microphone can be also provided. Furthermore, a UE may comprise appropriate connectors (either wired or wireless) to other devices and/or for connecting external accessories, for example hands-free equipment, thereto.

Figure 5:
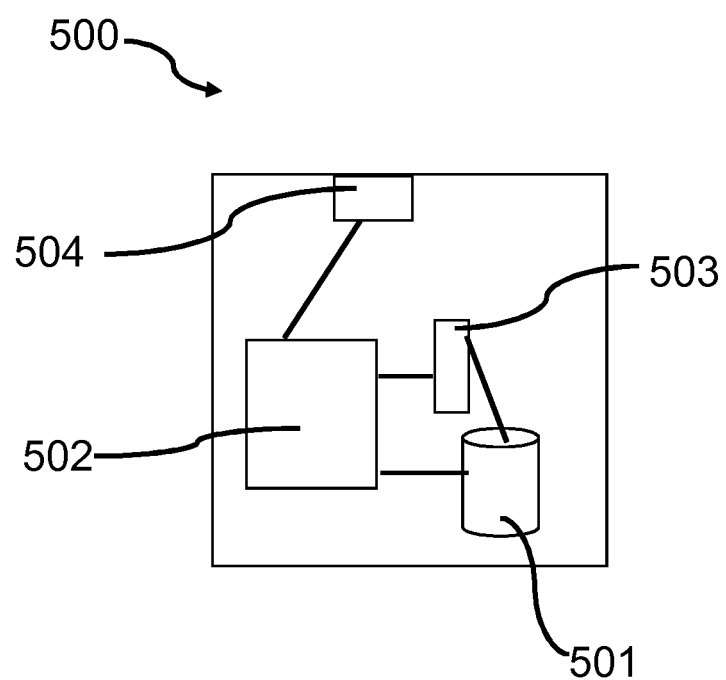
FIG. 5 schematically shows parts of a network entity according to an example.

FIG. 5 shows an example of a control apparatus for a communication system, such as an HSS or S-CSCF. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of the base station. The receiver and/or the transmitter may be implemented as a radio front end or a remote radio head. For example the control apparatus 500 can be configured to execute an appropriate software code to provide the control functions.

Figure 6:
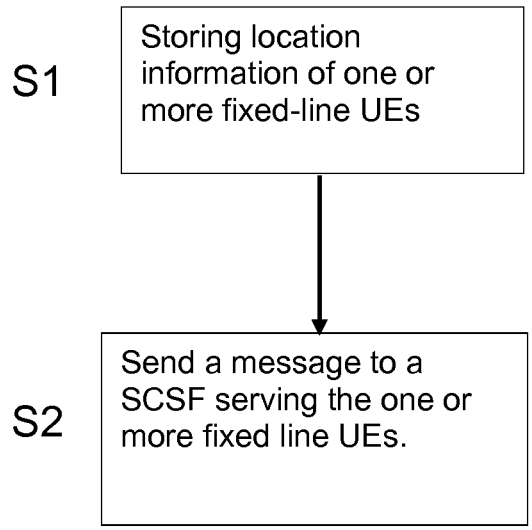
FIG. 6 is a flow-chart of a method according to an example.

FIG. 6 is a flow-chart of a method viewed from the perspective of an apparatus. Such an apparatus may be, for example, a home subscriber server (HSS).

At S1, the method comprises storing at the apparatus location information of one or more fixed-line user equipment operating in an internet protocol multimedia subsystem.

In response to an update of location information for one or more of the fixed-line user equipment, the method comprises at S2 sending a message to a serving call state control function serving the one or more fixed-line user equipment, the message indicating a location update of the one or more fixed-line user equipment whose location information has been updated at the apparatus.

Figure 7:
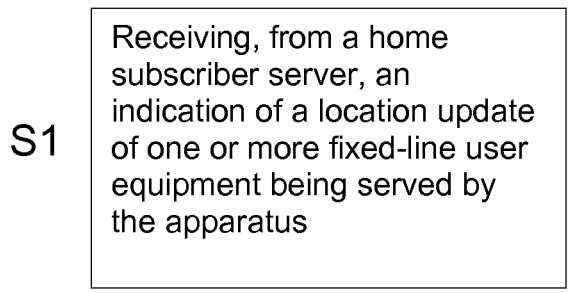
FIG. 7 is a flow-chart of a method according to an example.

FIG. 7 is a flow-chart of a method viewed from the perspective of an apparatus. Such an apparatus may be, for example, a serving call session control function (S-CSCF).

At S1, the method comprises receiving at the apparatus from a home subscriber server, an indication of a location update of one or more fixed-line user equipment being served by the apparatus.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile UE or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
   at least one processor; and
   at least one memory comprising computer program code,
   the at least one memory and computer program code configured, with the at least one processor, to cause the apparatus at least to:
   store location information of a fixed-line user equipment operating in an internet protocol multimedia subsystem; and
   in response to location information of the fixed-line user equipment being updated by the apparatus, send a registration termination request to a serving call state control function serving the fixed-line user equipment, the registration termination request comprising a reason code indicating that the location information of the fixed-line user equipment has been updated at the apparatus.

2. The apparatus according to claim 1, wherein the sending the registration termination request to the serving call state control function serving the fixed-line user equipment comprises sending the registration termination request to the serving call state control function in response to receiving a request to update the location information of the fixed-line user equipment at the apparatus.

3. The apparatus according to claim 1, wherein the registration termination request comprises an attribute value pair comprising the reason code indicating the location information of the fixed-line user equipment has been updated.

4. An apparatus, comprising:
   at least one processor; and
   at least one memory comprising computer program code,
   the at least one memory and computer program code configured, with the at least one processor, to cause the apparatus at least to:
   receive, from a home subscriber server, a registration termination request comprising a reason code indicating location information of a fixed-line user equipment being served by the apparatus has been updated by the home subscriber server; and
   in response to the receiving the registration termination request, send a notification to the fixed-line user equipment, the notification indicating that the fixed-line user equipment is temporarily deactivated by the apparatus for causing the fixed-line user equipment to re-register with the apparatus.

5. The apparatus according to claim 4, wherein the notification comprises a NOTIFY message comprising a deactivation event field comprising the notification indicating that the fixed-line user equipment is temporarily deactivated by the apparatus.

6. The apparatus according to claim 4, wherein the registration termination request comprises an attribute value pair comprising the reason code indicating location information of the fixed-line user equipment being served by the apparatus has been updated by the home subscriber server.

7. The apparatus according to claim 4, wherein the at least one memory and computer program code are further configured, with the at least one processor, to cause the apparatus at least to update emergency call information for the fixed-line user equipment, in response to the receiving the response from the home subscriber server.

8. The apparatus according to claim 7, wherein the emergency call information comprises public safety answering point information.

9. A method comprising:
   storing, at an apparatus, location information of a fixed-line user equipment operating in an internet protocol multimedia subsystem; and
   in response to the location information of the fixed-line user equipment being updated by the apparatus,
   sending, a registration termination request to a serving call state control function serving the fixed-line user equipment, the registration termination request comprising a reason code indicating that the location information of the fixed-line user equipment has been updated at the apparatus.

10. The method according to claim 9, wherein the sending the registration termination request to the serving call state control comprises sending the registration termination request to the serving call state control function in response to receiving a request to update the location information of the fixed-line user equipment at the apparatus.

11. The method according to claim 9, wherein the registration termination request comprises an attribute value pair comprising the reason code indicating location information of the fixed-line user equipment has been updated.

12. A method comprising:
   receiving at an apparatus from a home subscriber server, a registration termination request comprising a reason code indication location information of a fixed-line user equipment being served by the apparatus that has been updated by the home subscriber server; and
   in response to the receiving the registration termination request, sending a notification to the fixed-line user equipment, the notification indicating that the fixed-line user equipment is temporarily deactivated by the apparatus for causing the fixed-line user equipment to re-register with the apparatus.

13. The method according to claim 12, wherein the notification comprises a NOTIFY message comprising a deactivation event field comprising the notification indicating that the fixed-line user equipment is temporarily deactivated by the apparatus.

14. The method according to claim 12, comprising updating emergency call information for the fixed-line user equipment, in response to the receiving the response from the home subscriber server.

15. The method according to claim 14, wherein the emergency call information comprises public safety answering point information.

\* \* \* \* \*